United States Patent [19]
Lin et al.

[11] Patent Number: 6,052,785
[45] Date of Patent: Apr. 18, 2000

[54] MULTIPLE REMOTE DATA ACCESS SECURITY MECHANISM FOR MULTITIERED INTERNET COMPUTER NETWORKS

[75] Inventors: David Dah-Haur Lin; Amal Ahmed Shaheen; Krishna Kishore Yellepeddy, all of Austin, Tex.

[73] Assignee: International Business Machines Corporation, Armonk, N.Y.

[21] Appl. No.: 08/976,401

[22] Filed: Nov. 21, 1997

[51] Int. Cl.[7] .................................................. G06F 13/14
[52] U.S. Cl. ........................................... 713/201; 709/225
[58] Field of Search ............................... 713/201; 714/1; 709/223, 225, 227, 249; 380/4

[56] References Cited

U.S. PATENT DOCUMENTS

| | | | |
|---|---|---|---|
| 5,559,883 | 9/1996 | Williams | 380/4 |
| 5,586,121 | 12/1996 | Moura et al. | 370/404 |
| 5,586,260 | 12/1996 | Hu | 395/200.2 |
| 5,706,507 | 1/1998 | Schloss | 395/615 |
| 5,748,897 | 5/1998 | Katiyar | 395/200.49 |
| 5,867,667 | 2/1999 | Butman et al. | 395/200.79 |
| 5,896,798 | 4/1999 | Dent et al. | 395/187.01 |
| 5,903,721 | 5/1999 | Sixtus | 395/187.01 |
| 5,915,119 | 6/1999 | Cone | 395/750.02 |

*Primary Examiner*—Joseph E. Palys
*Assistant Examiner*—Omar A. Omar
*Attorney, Agent, or Firm*—Jeffrey S. LaBaw; Mark S. Walker

[57] ABSTRACT

A system and method for managing client authorization to access remote data repositories through a middle tier server such as a web server. Client remote data repository access is intercepted by the middle tier server and the server is searched for stored credentials permitting client access to the remote data repository. If found, the stored credentials are used to authenticate access without further interaction with the client system. If no stored credentials are found, the server requests credentials from the client and passes them to the remote data repository for validation. Validated credentials are stored by the server for future use and indexed by a client identifier. Permitted remote data repository access is stored with the validated credentials. Access to a mounted remote file system is not permitted without authorization even if the remote file system would not otherwise require authorization.

24 Claims, 5 Drawing Sheets

FIG. 2

| User Id | Distinguished Name | Session ID | Credentials/ Password | Access drives |
|---|---|---|---|---|
| Michael | CN=Michael, OU=Security, O="IBM PSP", L=Austin, ST=TX, C=US | | michael.cred | G: |
| Sandy | | FFF04360 | sandy.cred | H: |
| Sandy | CN=Sandy, OU=Security, O="IBM PSP", L=Austin, ST=TX, C=US | | sandy.cred | H: |

| Yellepeddy | CN=Krishna, OU=Security, O="IBM PSP", L=Austin, ST=TX, C=US | | krishna.passwd | P:, Q: |
| Lin | CN=Lin, CU=Security, O='IBM PSP', L=Austin, ST=TX, C=US | FFF04359 | dlin.passwd | O:, R:, S: |

MULTIPLE REMOTE DATA ACCESS SECURITY MECHANISM FOR MULTITIERED INTERNET COMPUTER NETWORKS

BACKGROUND OF THE INVENTION

1. Field of the Invention

The present invention relates to computer implemented authorization for access to remote data. More particularly, it relates to authentication of computer users for access to data managed by remote data repositories. Still more particularly, it relates to middle tier server management of multiple client access authorization to multiple remote data repositories.

2. Background and Related Art

Internet technology has enabled computer users to access increasing amounts of data for business and personal purposes. The "Internet" consists of computers linked to each other via a computer network using common communication protocols. Most networks implement the TCP/IP (transmission control protocol/internet protocol) as a means for communication between computers. The computers are designated as "client" computers or "server" computers. Client computers make requests for data from server computers according to one of a number of available client/server protocols. Internet users currently favor the Hypertext Transfer Protocol (HTTP) because of its ease of use. HTTP enables users to select data based on a text or graphical icon or image on their client system that represents a link to particular remote data. This interlinking of data through hypertext links creates a "web" of links that can be navigated by the user to access the data he or she desires.

The basic network structure includes a network server and one or more network clients. The network server contains software that enables it to respond to requests for data from the client machines. Server software includes the Internet Connection Server Software (ICS) from IBM Corp., the Lotus Domino Server from Lotus Development Corp., the Netscape SuiteSpot Server from Netscape Communications Corp., and the Internet Server Software from Microsoft Corporation. The above server software packages accept a request for information from the client system, locate the requested data and format and present the data back to that client. The data to be returned is typically contained on the server computer system or on a computer linked directly to that system.

Client computer systems employ a "browser" comprising software necessary for the client system to format a request, transmit the request to the appropriate server and then to receive and format the response to the user. A number of commercial browsers are in use, including Netscape Navigator and Netscape Communicator from Netscape Communications, and the Internet Explorer from Microsoft Corp. The use of standardized client/server protocols enables any browser conforming to the client protocols to communicate with any server having the reciprocal server protocol. This flexibility enables independent implementation of client and server technologies.

Communications between the client and server take place over communication links such as telephone lines and computer to computer telecommunication links that are not inherently secure. Users of networked computer systems have recognized the need for secure communications between the client and server systems as essential for applications such as on-line banking, electronic ordering of products, and transmission of credit card or other financial transactions. Two secure network protocols account for a majority of secure transactions over the Internet.

The Secure Sockets Layer (SSL) protocol was developed by Netscape Communications Corp. and initially incorporated in its browser and server products. The SSL protocol is described in *SSL Version* 3.0, Internet-Draft, published by Netscape Communications Corp. in December 1995. This protocol is also frequently referenced as the "HTTPS" protocol. The protocol specifies the interaction protocol and content between a client system and the server system in order to establish a "secure" link between the client and server. The secure link is implemented using encryption technology that encrypts the data flowing over the communications medium.

The Secure Hypertext Transfer Protocol (SHTTP) is the second popular security protocol. It is described in *The Secure HyperText Transfer Protocol—Version* 1.1, Internet-Draft 35, Enterprise Integration Technologies, December 1994. This protocol is built upon the basic HTTP protocol and provides extensions supporting secure communications between the client browser and server systems.

A particular server will typically implement both the SSL and SHTTP protocols and possibly others. This is necessary because of the internet architecture requiring a server to respond appropriately to a large number of client browsers with unspecified client software. Servers with limited protocol support have limited usefulness.

Figure 1:
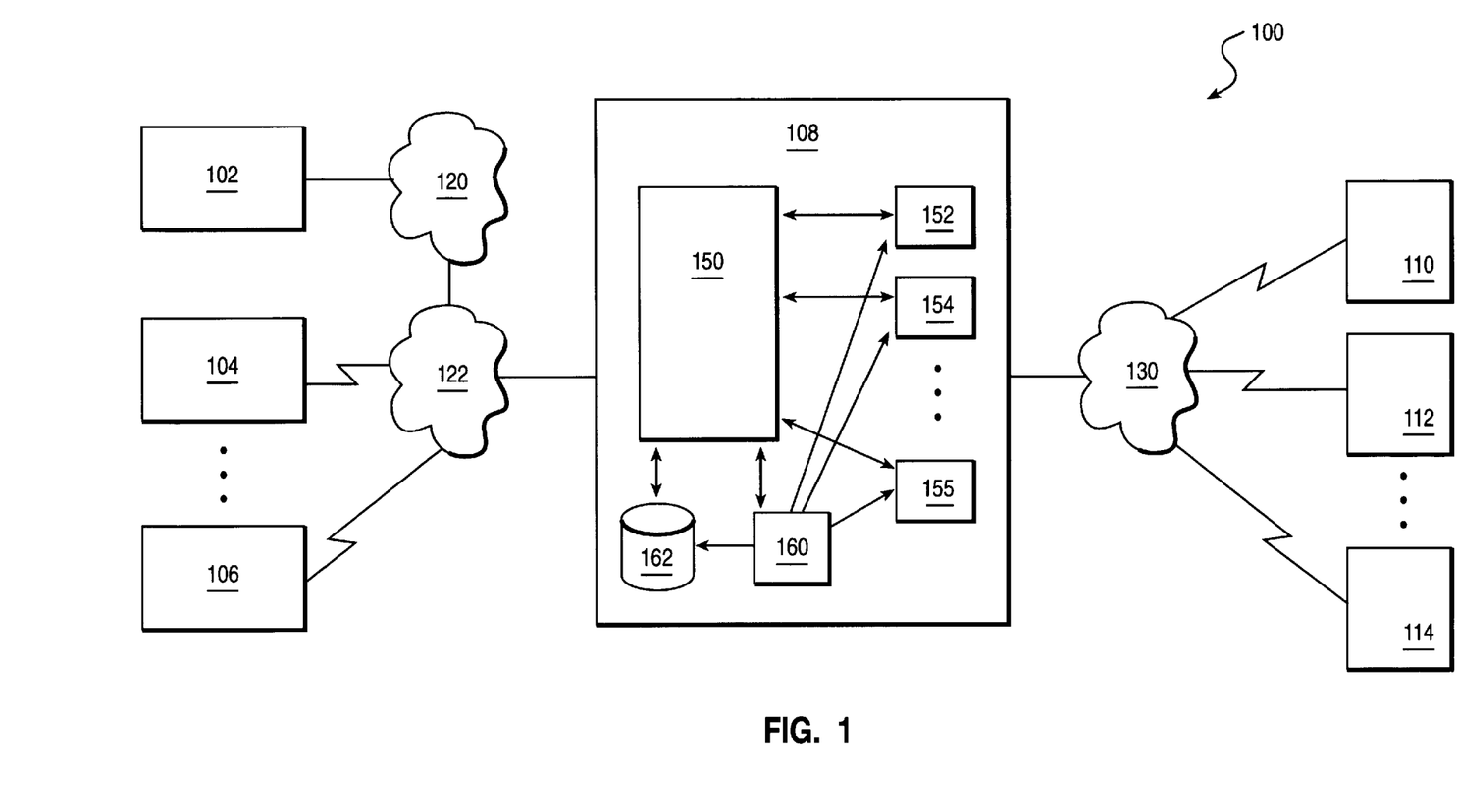
FIG. 1 is a block diagram of a three tier distributed computer system according to the present invention.

Web servers, such as those described above, access local and remote data. Companies have found that web servers and the internet (termed the "intranet" when use is limited to a specific company or firm) provide an effective means for disseminating corporate data. This data is contained in corporate databases and often is managed by older legacy information systems. Enabling web access permits access to legacy data using modern graphical user interfaces and network tools without requiring the legacy system to be rewritten. The resulting connection of client browser, server and data systems is termed the "three tier system model." The tiers include the client, a "middle tier server" such as the web server, and "back-end" data and file system servers. The three tier model is illustrated in FIG. 1 generally at 100.

The three tiered architecture 100 includes clients 102, 104, 106, middle tier server 108 and back-end data repositories 110, 112, and 114. The back-end data repositories include, but are not limited to: distributed file systems such as AFS, DFS, NFS; database servers such as IBM DB2, Microsoft SQLServer, Oracle or Informix database servers; Lotus Notes or Novel Groupwise groupware servers; or transaction management systems such as IBM CICS, IMS, or Transarc Encina systems. These back-end data sources are connected to the middle tier server through a local or wide area network and are collectively called remote data repositories. The term remote data repository includes data servers directly linked to the middle tier server through a switch or other interconnection device. Remote does not necessarily mean the data repository is geographically distant from the middle tier server.

The client-server tiers are linked by networks 120,122 that can include any combination of public or private data networks. The server-back-end tiers are connected by networks 130 that can also include combinations of public or private data networks or direct communication links between the computers.

Security between the client and server systems is managed using the SSL or SHTTP protocols discussed above. Most of the remote data repositories will, however, have their own security and authentication requirements. Each of the back-end systems may have a unique authentication scheme. Access to a particular data repository is dependent upon client access level. In most cases, an installation will not wish to allow a server to have unrestricted access to all remote data sources without individual client authentication.

A technical problem therefore exists in providing authorization control between a server and remote data repositories in a three tier client/server architecture.

Existing solutions to this problem require each user at a client workstation to authenticate with the remote data repository he or she seeks to access. The server software will recognize when authorization is required and will request authorization credentials from the client user. The client will enter the credentials and these will be passed through the server to the remote data repository for validation. If validated, the data requested will be provided.

One problem with this approach is the stateless query-response nature of client-server access. The remote data repository does not maintain a specified link with each client. Once requested data has been provided, the data repository "forgets" about the client. Thus, a subsequent access by the same client will require repeated authentication/validation. Existing systems attempt to solve this problem by having the client system retain the security credentials, for example, in local client cache, which can then be supplied to the server and data repository upon demand transparently to the user. This has the disadvantage of increasing network traffic between the server and client as each authentication demand must be passed by the server to the client and answered from the local client data. Since each transaction requires reauthorization this can be a significant performance penalty. This penalty is made even more evident to the user because client systems are often connected to the network through relatively slow modems.

Thus, the technical problem remains of providing authentication control between a server and remote data repository while limiting the message traffic between the server and the client. A further problem is to provide such a system that is able to support multiple client-server security protocols and multiple (and different) remote data repository authentication protocols.

SUMMARY OF THE INVENTION

The present invention is directed to providing a system, method and computer program product enabling client authentication with a server and single authentication of the client to a remote data repository, including distributed file system, database manager or transaction management system. The present invention enhances the middle tier server with back-end authentication management features including credential caching. These enhancements permit multiple client access to multiple remote data repositories while eliminating the need for the client to authenticate with the remote data repositories on each access.

The present invention includes a computer implemented method for managing security in a three tier networked computer system having multiple clients, a server, and one or more remote data repositories, the method including the steps of: authenticating client access to the server; intercepting in the server a client request for access to a remote data repository; testing for stored client credentials to access the remote data repository; if not found, requesting client credentials and validating the credentials with the remote data repository, and storing the validated credentials; and processing the request for accessing using stored client credentials.

It is therefore an object of the present invention to eliminate client-remote data repository authentication for all but the first access to the remote data repository by the client in a session.

It is yet another object of the invention to eliminate repeated requests for authentication from a server once a client has been authenticated for a data repository.

It is yet another object of the invention to control remote file system drive access by enforcing mount authentication before permitting client access to previously mounted remote file systems.

The foregoing and other objects, features and advantages of the invention will be apparent from the following more particular description of a preferred embodiment of the invention, as illustrated in the accompanying drawing wherein like reference numbers represent like parts of the invention.

DETAILED DESCRIPTION

The preferred embodiment of the present invention is practiced in a three tier distributed processing architecture. The present invention, however, can be practiced in any multitiered distributed processing environment with two, three or more tiers. In such a multitiered environment, the client credentials will be stored a designated server. In a two tiered system, the present invention offers a means to increase security and simplify credential management by augmenting existing security and authentication schemes.

The present invention is directed to a computer system, computer implemented method, and computer program product for managing security authentication in a multitiered networked computer environment. The preferred embodiment of the invention is practiced on an IBM Personal Computer such as the IBM PC/700 having an Intel microprocessor. Alternatively, the invention can be practiced using a workstation or server such as the IBM RS/6000 Server or similar servers from Sun Microsystems or Hewlett-Packard. The server is under the control of an operating system such as the IBM OS/2, IBM AIX, Sun Solaris, Microsoft Windows NT, or Hewlett-Packard HP-UX operating system. The preferred embodiment uses the OS/2 operating system. A multitiered network will typically consist of many different computers and operating systems.

Figure 2:
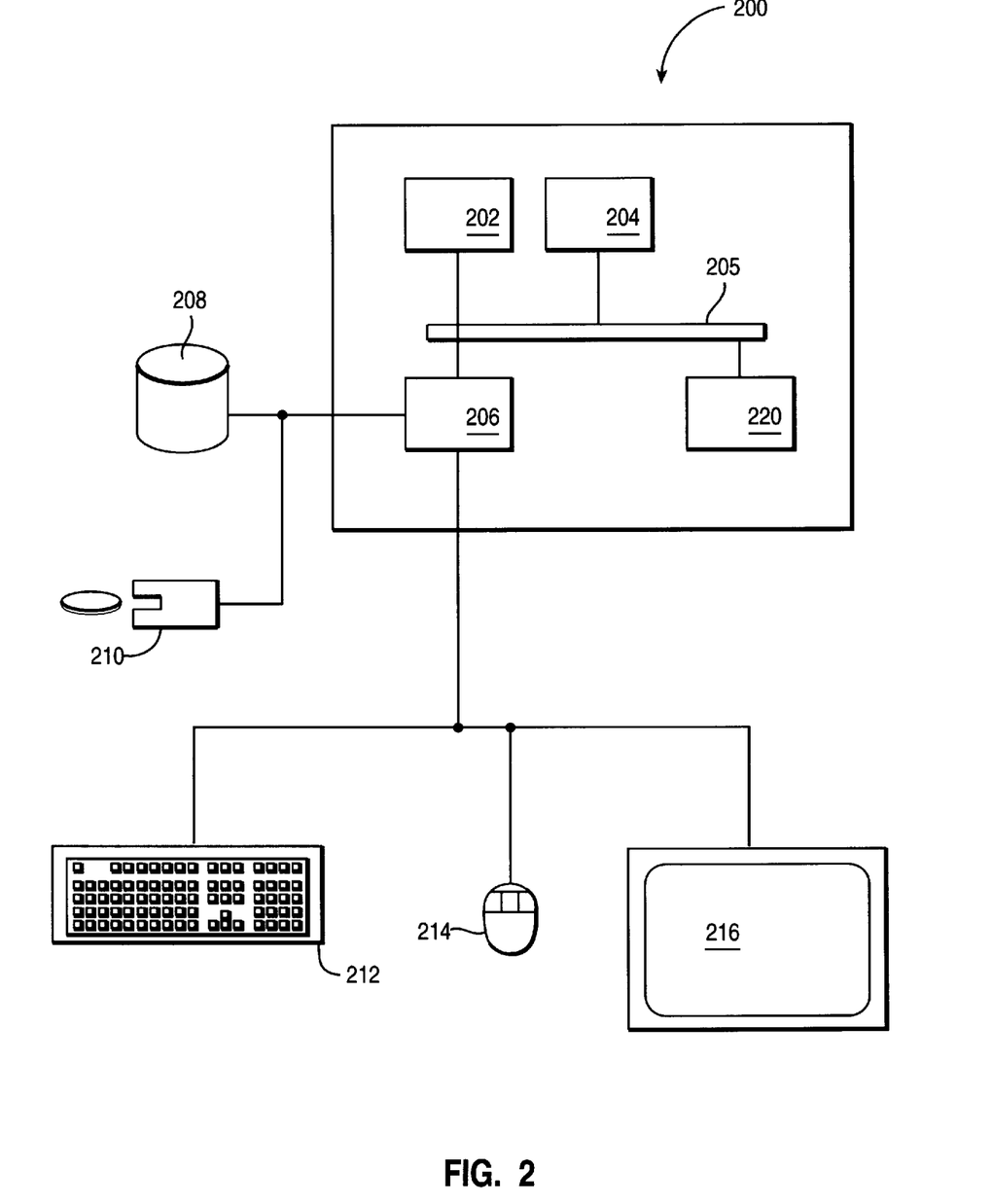
FIG. 2 is a block diagram of a computer system according to the present invention.

The basic structure of a server computer system according to the preferred embodiment of the present invention is shown in FIG. 2 at 200. Instruction processing and control is carried out by one or more processors 202. Random access memory 204 is accessible to the processors over system bus 205. Input/Output controller 206 is attached to the system bus and controls access to permanent storage 208 and removable storage 210. Permanent storage includes rotating and static memory devices that store data magnetically or optically. Removable media 210 can include magnetic disks or diskettes, and optical CD-ROM disks. User interaction is supported through keyboard 212, graphic display 216 and pointing device 214. Computer system 200 is connected to a network through communications controller 220. The network can operate according to any known or newly discovered protocol, including ethernet, token ring, and asynchronous transfer mode.

The client systems using the present invention can be of similar configuration. They may, however, also comprise network computers without permanent or removable storage. Back-end data repository servers and remote file systems will typically have large permanent and removable storage capacity and will frequently include multiple processors 202 in a symmetric multiprocessing (SMP) or clustered configuration. Such back-end servers provide the needed capacity to support large numbers of distributed client systems.

The middle tier server according to the present invention will be described in greater detail with reference to FIG. 1. Server 108 includes software to manage client requests for data or other services. Standard server software, such as an IBM Internet Connection Server (ICS) or a Lotus Go Domino server, 150 accepts client requests, interprets them, and formats and send the necessary response. Standard remote data repository is provided through remote data repository clients 152, 154, 155. Each of these clients supports access to a particular type of data repository. For example, client 152 may support access to an IBM DB2 Database Server, while client 154 supports access to a remote file system managed by a Distributed File System (DFS) protocol. Additional back-end servers can include, Lotus Notes groupware servers, CICS transaction servers, Microsoft SQLServers, and others. Each type of server will have an associated client managing the interaction between the server software 150 and the remote data repository. Server software 150 can be web server software or other server software such as Windows NT, Novell Netware, or IBM Lan Server software.

Client authorization to use the server is managed by the server software 150 either directly or through a separate security server. The creation of a secure client/server session can be managed using any of a number of security management systems. The preferred embodiment of the present invention enables a client to use either the SSL or SHTTP secure network protocol. The process of establishing a secure connection is described in greater detail below. User authorization is validated at the server using an authentication service. The preferred embodiment employs the IBM Distributed Security Services (DSS) product that implements the X/Open Distributed Computing Environment (DCE) security model. Use of a separate security server reduces the authentication workload of the web server. Initial authorization of the client user causes the security server to return credentials for multiple applications if they are available. The single request will cause the security server to find and return all applicable credentials for that user. These credentials are then stored, according to the present invention, in the security hash table enabling the user to access the identified applications without further authentication.

The secure sockets layer (SSL) protocol is composed of two layers. The lowest level SSL Record Protocol is layered on a reliable transport protocol such as TCP/IP. The SSL Record Protocol encapsulates various higher level protocols. One of these is the SSL Handshake protocol that establishes a secure session between the client and server. During handshaking the client and server first authenticate each other. Then they negotiate an encryption algorithm by exchanging information on the encryption preferred and supported until agreement is reached. Finally, the client and server exchange encryption keys before beginning data transmission. If authentication fails or the systems cannot negotiate an acceptable encryption algorithm, then the connection creation attempt fails. Hypertext Transfer Protocol (HTTP) support is layered on top of SSL to provide secure internet transactions. SSL was originally designed to authenticate only the server. Later versions of SSL add client authentication.

Secure Hypertext Transfer Protocol (SHTTP) client authentication is also supported in the preferred embodiment. SHTTP was designed to provide secure communications between HTTP clients and servers. SHTTP, in contrast to SSL, was originally designed to support symmetrical authentication between the client and server. This protocol is an extension of the unsecure HTTP protocol and provides flexibility in choosing key management mechanisms, security policies, and cryptographic algorithm support through a negotiation process between the client and server for each transaction. Both parties can express their requirements and preferences as to the cryptographic enhancements they will permit or require from the other party. The finally selected options form the negotiated cryptographic agreement known as the CRYPOPTS between the parties. Once set, real data transmission can begin.

The present invention introduces a server to back-end credential management function 160. Web server 150 will be modified in software or through hardware, to support credential management. The file system gateways, 152, 154, 155 are also modified to intercept file system requests and attempt to validate them using credential management 160. The server to data repository client API is modified to add support for exchanging session information with the file system clients. Credential management can include the separate function 160 that is accessed by all of the data repository clients, or, in an alternate embodiment, this additional function can be included in each of the file system clients.

Credential management according to the present invention employs a hash table for secure back-end server access. The hash table includes the following data elements:

| | |
|---|---|
| User ID | The user ID recognized by the DSS Security Services |
| Distinguished Name | The Distinguished Name provided by the Certificate Authority (CA) which issues the certificate to the client/server for SHTTP use. |
| Session ID | The numeric ID generated by an SSL server to identify a particular browser client to which a security session has been established (SSL). |
| Credentials/Password | A pointer to a credentials file managed on disk by the DSS client, or simply the password depending on the requirements for authenticating the user. |
| Access Drives | List of drives or mount points to which access has been authorized on remote file system |

Support for secure protocols other than SSL and SHTTP can be incorporated by adding the data element that identifies the secure client-server session to this table (i.e. that correspond to the distinguished name for SHTTP).

Figure 3:
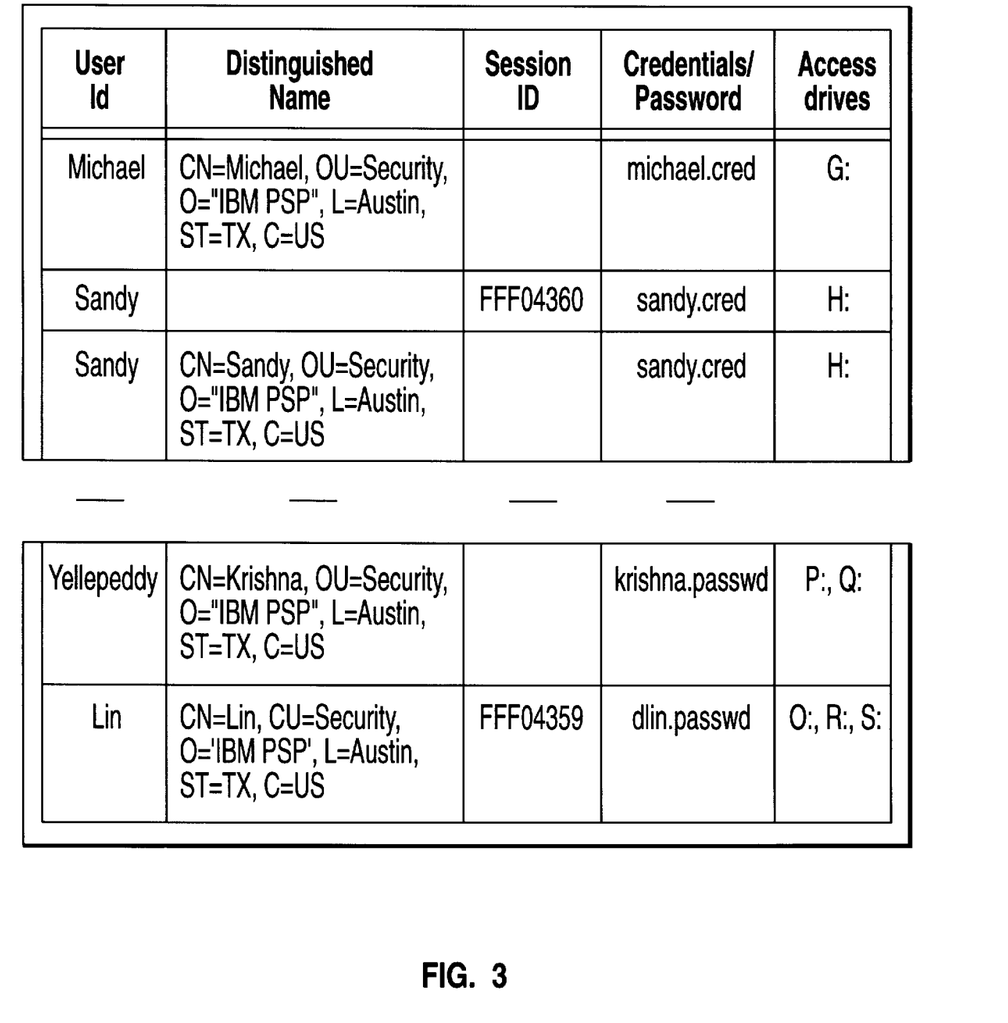
FIG. 3 is an illustration of a security hash table according to the present invention.

FIG. 3 contains an example of a table stored according to the present invention. The hash table is stored in the server at 162 in random access memory. This embodiment implements filtering and intercepting with cached credential data. Cached user hash table data is retained for a limited period after which the authentication and validation must be repeated. The length of the retention period depends on the amount of storage allocated and the level of client activity on the server. In an alternate embodiment, the table is copied to persistent storage, such as a hard disk, so that it can be used over a reboot of the server. This persistent storage in the middle tier enables fault tolerance and client credential reuse over longer periods of time.

Figure 4:
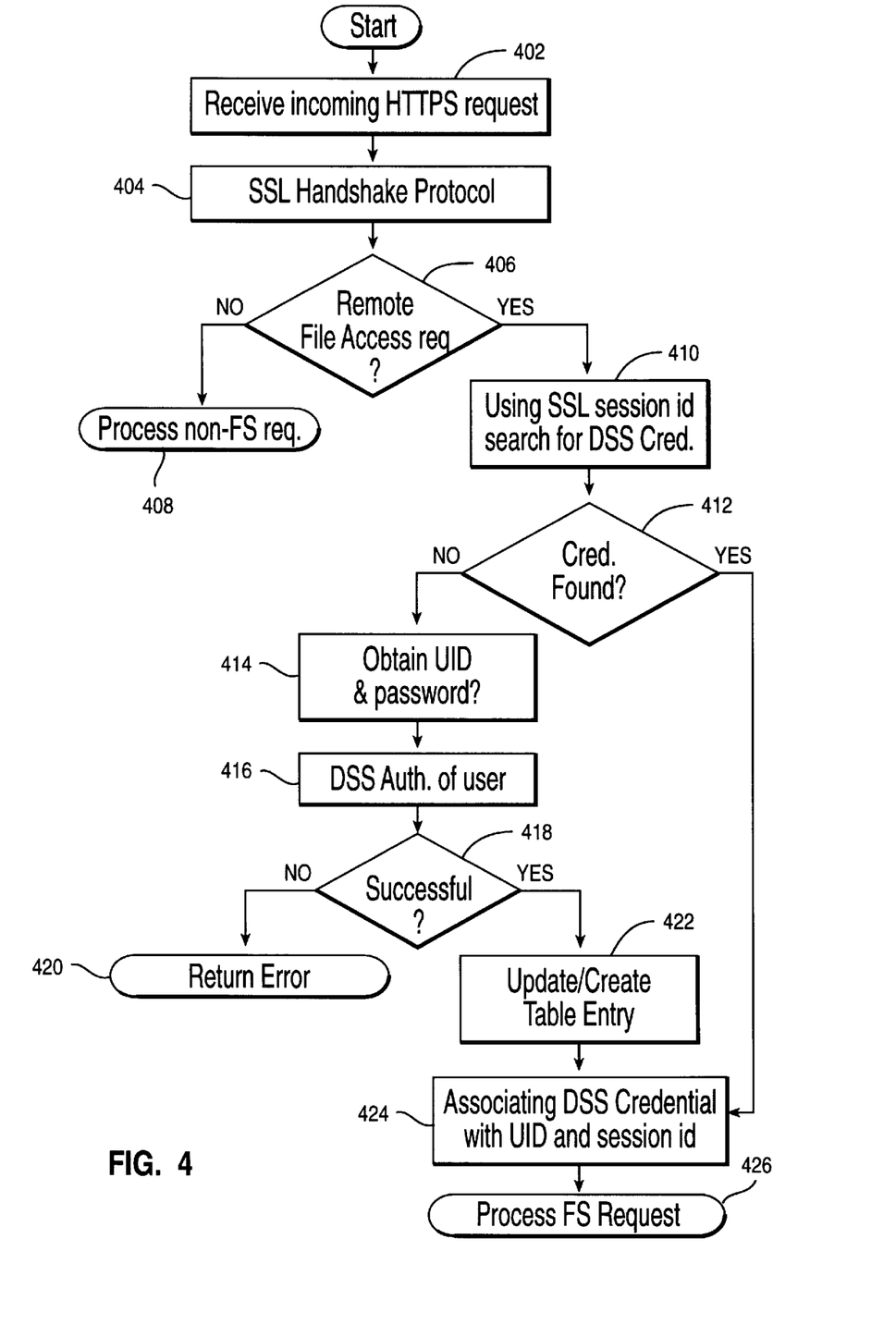
FIG. 4 is a flow chart illustrating the process steps of a part of the present invention.
Figure 5:
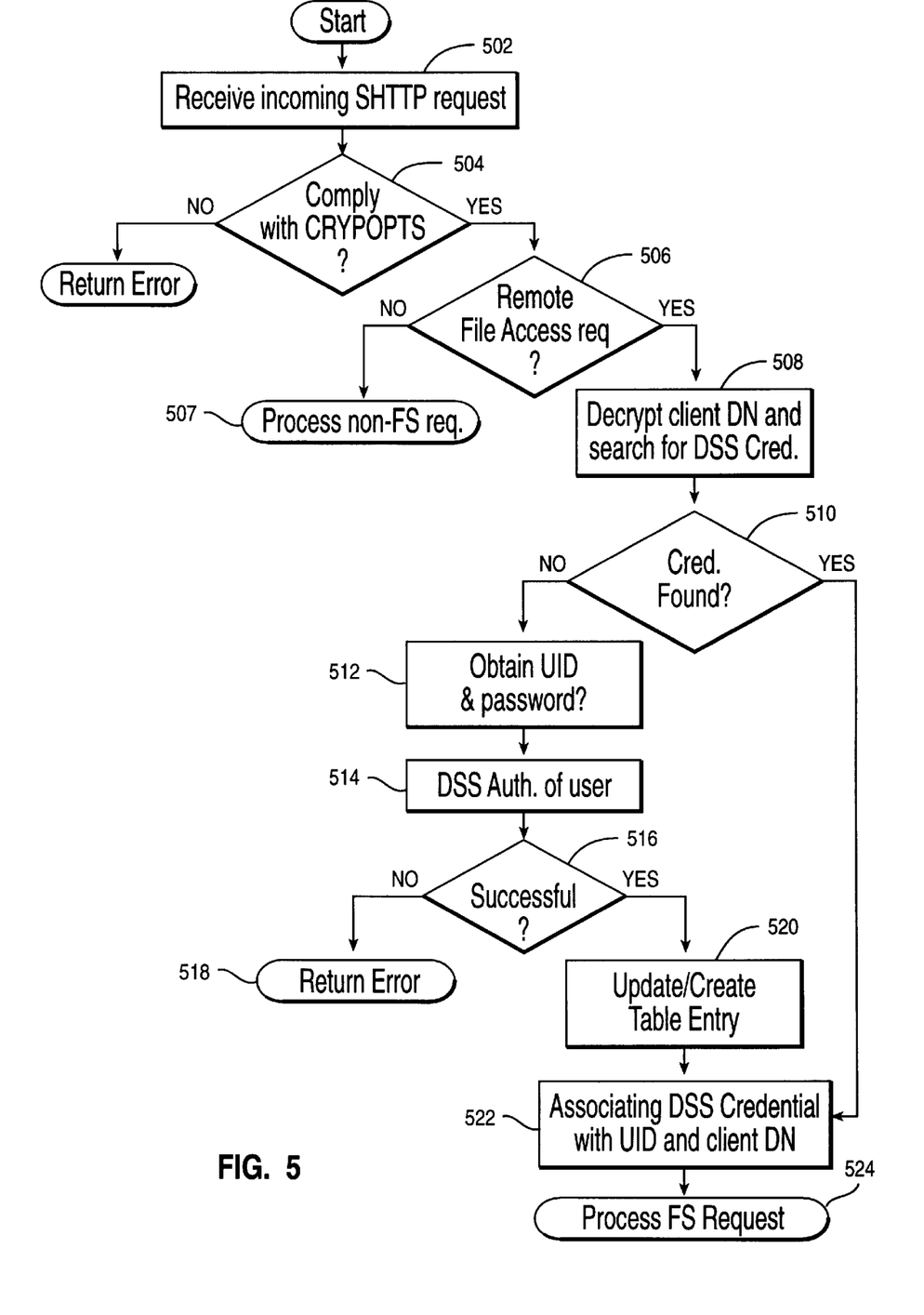
FIG. 5 is a flow chart illustrating the process steps of a second part of the present invention.

The process for managing remote data repository credentials is shown in FIGS. 4 and 5 which illustrate the flow of logic in response to an access request from an SSL(HTTPS) or SHTTP session respectively.

The process receives an SSL request for data access 402. The normal SSL handshake protocol 404 (discussed above) is performed resulting in a secure session between the client and server. The client will provide a userid and other required credentials to establish the session. A session ID is assigned to this SSL communication session. The server next tests 406 whether the request requires remote data repository or not. If remote data repository is not required the non-file system request is processed 408 in accordance with the standard configuration.

If remote data repository is required, the SSL session id is used to access the hash table 162 to locate any previously stored credentials. If credentials are found 412, and they have not expired, they are associated with the request 424 and used to process the remote data repository request 426.

A failure to locate stored credentials causes the server first attempt to locate a User ID and password in the encrypted request message. If no encrypted credentials are found, the server prompts the client user with a Login Form for a User ID and password to authenticate data repository access 414. The User ID and password from the request or the login form are passed to a security server or remote data repository for authentication 416. Authentication can be through a single security server such as the IBM Distributed Security Services (DSS) or can be through the individual back-end servers. If authentication fails, 418, an error message is returned to the user 420. After successful authentication, the hash table entry according to the present invention is created or updated 422. The hash table entry for an SSL initiated transaction includes the User ID of the client user, the SSL session ID, the obtained credentials, and a list of drive letters to which authorized access is granted.

Client access using the SHTTP operates in a similar manner, with minor changes due to the different security protocol. The process is shown in FIG. 5. The server recognizes the security protocol as SSL, SHTTP or other, based on the protocol designator contained in the received URL (uniform resource locator.)

An incoming SHTTP request for server access is received 502 by the server. The request causes initiation of encryption negotiations with the client. The server can decide 504 to comply with the suggested CRYPTOPTS, reject the current options proposed by the client, or challenge the client before making it decision (by issuing a NONCE message.) If an agreement is not reached, an error is returned to the client system 505. Agreement between the client and server causes creation of a certificate that will be used throughout the transaction to encrypt and decrypt messages. The request is next tested to determine whether or not remote data access is required 506. If not, the request is handled normally 507 as a non-remote file system request. Remote data repository access requirements cause the system to decrypt the certificate in the request to extract the client userid and Distinguished Name (DN) and to use the userid to access the security hash table to find any stored credentials 508. Existing credentials 510, if unexpired, are associated with the User ID and client Distinguished name 524 and used to process the remote data repository request 524.

In the absence of stored credentials, the server will attempt to locate credentials in the encrypted message or, failing to find them, request the user ID and password from the user 512. The credentials are authorized 514 leading to an error message 518 if authentication fails. If successfully authenticated 518, the credentials are used to update or create a hash table entry 520 and are associated with the User ID and Distinguished Name 522 for file system access 524.

A security mechanism according to the present invention provides logon coordination. This enables the client to authenticate once with the security server and have those credentials used repeatedly without validation. A single security server supporting multiple applications gives the client authenticated access to those multiple applications without the overhead of repeated credential requests and validations. This increases the responsiveness and throughput of the server.

The remote file access mechanism of the present invention provides increased control over access to remote file systems than is currently provided by server software. When a user accesses a remote file system using NFS or DFS, the file system is mounted as a specific drive letter on the server if the user has the authority to mount that file system. The network file system (NFS) is a distributed file system manager developed by Sun Microsystems, Inc. The Distributed File System (DFS) product is based on distributed file system standards and has been developed and marketed by the Transarc Corp. A subsequent different client access to that drive letter would be permitted without checking whether the new user has mount permission because the drive is already mounted. The present invention prohibits this secondary access to mounted drives. The accessed drives for a user are maintained in the security hash table. An attempt to access an unlisted drive requires the user to authenticate with the remote file system including testing whether or not the user has authority to mount that file system.

The ability to control access to mounted drives increases security in a three or more tiered server system. It also provides increased security in a two tiered client/server system with standard file server software (such as Windows NT) instead of Web Server software.

Security hash table storage on the server enhances fault tolerance and failure recovery in a clustered system. The failure of the server handling a transaction can be recovered by another server in the cluster that has access to the security hash table. This failover capability enables the client to be logged on to new server on the basis of information stored in the hash table. Smooth failover is important in server clusters supporting large web sites.

The security hash table of the present invention supports authentication between the server and the remote data repositories without repeatedly querying the client system for credentials. An example of the operation of the system and method according to the invention is discussed with respect to the hash table illustrated in FIG. 3.

User "michael" uses SHTTP to attempt to access drive G. The system of the present invention attempts to use the User ID and password used for authentication with the server, and to obtain additional remote data repository credentials from the security server (e.g. DSS.) Once authenticated, the credentials returned are stored in the hash table in an entry indexed by Michael's Distinguished Name (DN), i.e. "CN=Michael, OU=Security, O='IBM, PSP'2, L=Austin, ST=TX, C=US." The credential, e.g. michael.cred and access drive information is stored as shown in the first row of the table in FIG. 3.

A second user "sandy" uses SSL to attempt to access drive H. Since SSL is the security protocol, the SSL Session ID is used as the key to the hash table. The second entry in FIG. 3 illustrates the data stored.

If Michael attempts to access Drive H, the request will be denied because his entry permits access only to drive G. He will be required to authenticate with the file system having drive H before being permitted to proceed.

Sandy could attempt to access the same remote drive through a different browser using the SHTTP protocol. In the preferred embodiment, she will be permitted access because of the credentials associated with her userid and an additional table entry will be created based on her Distinguished Name. In an alternate embodiment, her first entry would be updated to include her Distinguished Name instead of creating a second entry.

It will be understood from the foregoing description that various modifications and changes may be made in the preferred embodiment of the present invention without departing from its true spirit. It is intended that this description is for purposes of illustration only and should not be construed in a limiting sense. The scope of this invention should be limited only by the language of the following claims.

We claim:

1. A computer implemented method for managing security in a multitiered networked computer system having multiple clients, a middle tier server, and one or more remote data repositories, the method including the steps of:
   authenticating client access to said middle tier server;
   intercepting in said server a client request for access to a remote data repository;
   testing for stored client credentials to access said remote data repository;
   if not found, requesting client credentials and validating said credentials with said remote data repository, and storing and associating said validated credentials with a client user identifier and a client session identifier; and
   processing said request for accessing using stored client credentials.

2. The method of claim 1, wherein the step of authenticating client access operates according to the secure sockets layer protocol (SSL) or the secure hypertext transfer protocol (SHTTP).

3. The method of claim 1, wherein the step of storing said validated credentials includes the steps of:
   creating a table entry containing a client user identification from said authenticating step, a client session identifier based on a method used for said authentication, the validated credentials, and the remote data repository access permitted;
   storing said table entry in a security table indexed by said client user identifier;
   updating an index based on said client user identifier.

4. The method of claim 3, wherein the remote data repository access permitted is stored as a computer system drive letter.

5. The method of claim 3, wherein the remote data repository access permitted is stored as a file system mount point.

6. The method of claim 3, wherein the remote data repository is a distributed file system managed by a distributed file system protocol.

7. The method of claim 6, wherein the distributed file system protocol is DFS.

8. The method of claim 1, wherein the remote data repository is a database server.

9. The method of claim 1, wherein the remote data repository is a transaction processing system server.

10. The method of claim 1, wherein the remote data repository is a groupware server.

11. The method of claim 8, wherein the distributed file system protocol is NFS.

12. The method of claim 1, further comprising the steps of:
   sharing said stored client credentials with at least a second middle tier server;
   transferring a client session from said middle tier server to said second server having access to said stored client credentials without reauthorization from said client.

13. A system for managing secure remote data repository access in a multitiered distributed network having a plurality of clients, a middle tier server, and one or more remote data repositories, the system comprising:
   storage means in said server for storing client credentials for access to one or more of said remote data repositories;
   authentication means in said server for authenticating client access to said middle tier server;
   means for intercepting client remote data repository access requests;
   means for retrieving client authentication from said storage means in response to said means for intercepting;
   means for requesting client credentials from said client and validating said credentials with said one or more remote data repositories, if said means for retrieving is unable to locate stored client credentials for the requested remote data repository; and
   means for storing and associating validated client credentials with a client user identifier and a client session identifier in said storage means.

14. The system of claim 13 wherein the authentication means includes secure socket layer authentication and secure hypertext transfer protocol authorization.

15. The system of claim 13 wherein said means for storing includes:
   means for creating a client credential record including at least a client identifier, a session identifier, the validated credentials, and remote data repository access permitted;
   means for storing said client credential record in said storage means, and
   means for updating an index to said client credential record based on said client identifier.

16. The system of claim 13, wherein said one or more remote data repositories include zero, one or more of a database server, a transaction processing system server, a groupware server, or a distributed file system server.

17. A method of controlling access to mounted remote file systems in a computer system having a processor and storage means, the method including the steps of:
   intercepting a requester request to access a mounted remote file system;
   testing said request to determine whether stored remote file system mount permissions exist for said requester;
   if not, requesting credentials from said requester and validating them with the remote file system, and storing and associating the credentials with a client user identifier and a client session identifier and a validated mounted file system reference;

if credentials exists, passing said request to said remote file system.

18. The method of claim 17, wherein the mounted remote file system is mounted as a network drive letter and said validated mounted file system reference is said drive letter.

19. A computer program product having a computer readable medium having computer program logic recorded thereon for managing security in a multitiered networked computer system having multiple clients, a middle tier server, and one or more remote data repositories, said computer program product comprising:

computer program product means for authenticating client access to said middle tier server;

computer program product means for intercepting in said server a client request for access to a remote data repository;

computer program product means for testing for stored client credentials to access said remote data repository;

computer program product means for requesting client credentials and validating said credentials with said remote data repository, and storing and associating said validated credentials with a client user identifier and a client section identifier, if no stored client credentials are found; and computer program product means for processing said request for accessing using stored client credentials.

20. The computer program product of claim 19, wherein the computer program product means for storing said validated credentials includes:

computer program product means for creating a table entry containing a client user identification from said authenticating, a client session identifier based on a method used for said authentication, the validated credentials, and the remote data repository access permitted;

computer program product means for storing said table entry in a security table indexed by said client user identifier; and computer program product means for updating an index based on said client user identifier.

21. The computer program product of claim 19, wherein the remote data repository is a database server.

22. The computer program product of claim 19, wherein the remote data repository is a transaction processing system server.

23. The computer program product of claim 19, wherein the remote data repository is a distributed file system managed by a distributed file system protocol.

24. The computer program product of claim 19, wherein the remote data repository is a groupware server.

* * * * *